(12) United States Patent (10) Patent No.: US 8,570,813 B2
Ucciardello et al. (45) Date of Patent: Oct. 29, 2013

(54) CHARGE PUMP CIRCUIT USING LOW VOLTAGE TRANSISTORS

(75) Inventors: Carmelo Ucciardello, Catania (IT);
Antonino Conte, Tremestieri Etneo (IT);
Santi Nunzio Antonino Pagano,
Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 18 days.

(21) Appl. No.: 13/421,322

(22) Filed: Mar. 15, 2012

(65) Prior Publication Data
US 2012/0250421 A1 Oct. 4, 2012

(30) Foreign Application Priority Data

Apr. 1, 2011 (IT) .............................. TO2011A0292

(51) Int. Cl.
*G11C 11/34* (2006.01)
(52) U.S. Cl.
USPC ................................ 365/185.27; 365/185.24
(58) Field of Classification Search
USPC ........................................ 365/185.27, 185.24
See application file for complete search history.

(56) References Cited

U.S. PATENT DOCUMENTS

2006/0006925 A1 * 1/2006 Yamazoe et al. .............. 327/536

FOREIGN PATENT DOCUMENTS

EP 1881589 1/2008

OTHER PUBLICATIONS

Cruz et al., "A charge pump without overstress for standard cmos process with improved current driver capability", Electrical and Electronics Engineers in Israel, 2008, IEEEI 2008, IEEE 25TH Convention of IEEE, Dec. 3, 2008, pp. 618-622.
Moisiadis et al., "Charge pump circuits for low-voltage applications", VLSI Design, vol. 15, No. 1, 2002, pp. 477-783, Retrieved From the Internet: URL: http://downloads. hindawi.com/journals/vlsi/2002/216208.pdf, [retrieved on Jan. 24, 2012].
Wong et al., "A low-voltage charge pump with wide current driving capability", Electron Devices and Solid-State Circuits (EDSSC), 2010 IEEE International Converence of IEEE, Dec. 15, 2010, pp. 1-4.

* cited by examiner

*Primary Examiner* — Michael Tran
(74) *Attorney, Agent, or Firm* — Allen, Dyer, Doppelt, Milbrath & Gilchrist, P.A.

(57) ABSTRACT

The charge pump circuit has a plurality of cascaded charge pump stages, each provided with a first pump capacitor connected to a first internal node and receiving a first high voltage phase signal, and a second pump capacitor connected to a second internal node and receiving a second high voltage phase signal, complementary with respect to the first. A first transfer transistor is coupled between the first internal node and an intermediate node, and a second transfer transistor is coupled between the second internal node and the intermediate node. The first and second high voltage phase signals have a voltage dynamics higher than a maximum voltage sustainable by the first and second transfer transistors. A protection stage is set between the first internal node and second internal node and respectively, the first transfer transistor and second transfer transistor, for protecting the same transfer transistors from overvoltages.

24 Claims, 6 Drawing Sheets

(PRIOR ART)

Fig.4

(PRIOR ART)

CHARGE PUMP CIRCUIT USING LOW VOLTAGE TRANSISTORS

FIELD OF THE INVENTION

The present invention relates to charge pump circuits using low voltage transistors.

BACKGROUND OF THE INVENTION

As is known, charge pump circuits are widely used in a wide range of electronic applications to obtain output voltage values higher than a given input voltage (basically operating as DC-DC boost converters), exploiting the use of capacitors as charge-accumulation elements. For example, charge pump circuits are used in flash-memory devices for generating the high voltage values required for performing data reading, writing, and erasing operations, starting from the low values of the internal supply voltage (the so-called "logic supply voltage Vdd", with values, for example, comprised between 1 V and 1.35 V, for CMOS flash-memory devices in 90-nm technology).

In particular, charge pump circuits of a latch type (also known as "latch circuits") have been proposed, operating with just two enabling signals (or phase signals) and using only low voltage transistors (having, for example, a maximum sustainable voltage comprised between 1 V and 1.35 V). These circuits are thus able to operate at high frequencies, for example of the order of 100 MHz (unlike common four-phase charge pump circuits, capable of reaching at most frequencies of 10-50 MHz).

Figure 1:
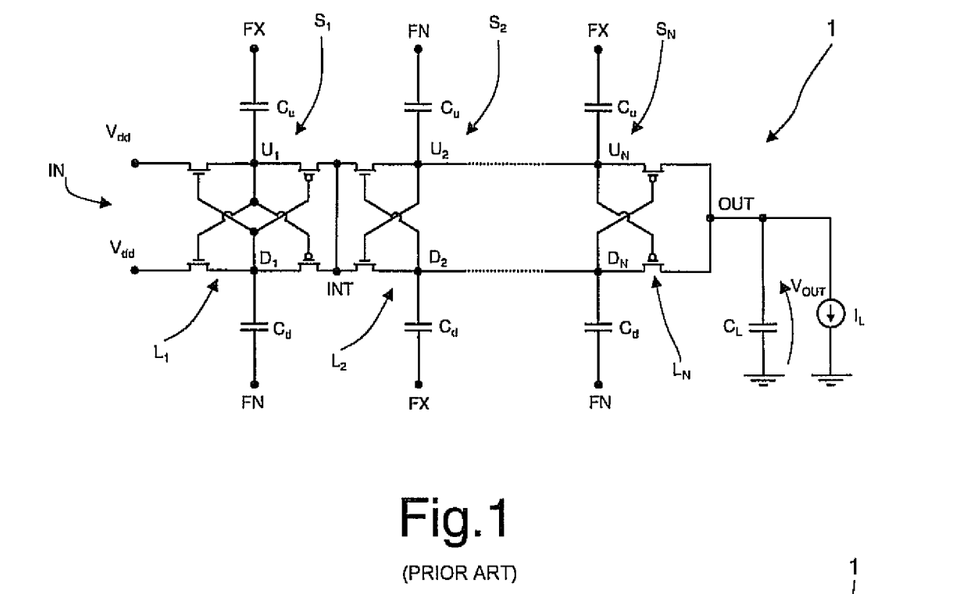
FIG. 1 is a schematic illustration of a first charge pump circuit of a known type.

In brief, and as shown in FIG. 1, a two-phase charge pump latch circuit, designated as a whole by 1, has an input terminal IN, on which it receives the logic supply voltage Vdd (in particular, a supply voltage with logic values), and an output terminal OUT, on which it supplies the boosted output voltage Vout, for a load (schematically represented as the parallel connection of a load capacitor $C_L$ and a current generator $I_L$).

The charge pump circuit 1 comprises a plurality N of stages $S_1, \ldots, S_N$, cascaded between the input terminal IN and the output terminal OUT, each receiving a first low voltage phase signal FX and a second low voltage phase signal FN, having negated (or complementary) values with respect to one another. An intermediate node INT is present between two successive stages in the charge pump circuit 1 (the intermediate node INT hence corresponding to the output of the previous charge pump stage $S_{i-1}$, and to the input of the next stage $S_i$). The low voltage phase signals FX, FN have, for example, logic values equal to 0 (or ground, GND) or to Vdd, and are generated by an appropriate generator circuit (not illustrated).

Each stage $S_1, \ldots, S_N$ comprises a first pump capacitor $C_u$ and a second pump capacitor $C_d$, receiving the first low voltage phase signal FX or the second low voltage phase signal FN (it should be noted that the arrangement of the phase signals is reversed from one stage to the next; i.e., if the first pump capacitor $C_u$ of a given stage receives the first low voltage phase signal FX, the corresponding first pump capacitor $C_u$ of the immediately preceding stage and immediately subsequent stage receives the second low voltage phase signal FN). The first and second pump capacitors $C_u$, $C_d$ are moreover connected, respectively, to a first internal node $U_1, \ldots, U_N$ and to a second internal node $D_1, \ldots, D_N$.

Each stage $S_1, \ldots, S_N$ further comprises a latch circuit $L_1, \ldots, L_N$, comprising a pair of NMOS latch transistors (of a low voltage type) and a pair of PMOS latch transistors (which are also of a low voltage type), the control terminals of which are appropriately connected to the internal nodes $U_1, \ldots, U_N, D_1, \ldots, D_N$, so as to provide switches designed to enable selective and alternate transfer of the charge accumulated in the pump capacitors $C_u$, $C_d$ from one stage to the next (these transistors are for this reason commonly referred to as "pass transistors").

In particular, it may readily be appreciated that the arrangement of the transistors in the latch circuits $L_1, \ldots, L_N$ is such as to perform transfer of charge between the first pump capacitors $C_u$ of successive stages, in a first half-period (in which the first low voltage phase signal FX is high, for example equal to Vdd, and the second low voltage phase signal FN is low, for example equal to 0 V), and to perform transfer of charge between the second pump capacitors $C_d$ of successive stages, in a second half-period (in which the first low voltage phase signal FX is low and the second low voltage phase signal FN is high), thus guaranteeing the voltage-boost effect between the input terminal IN and the output terminal OUT. The first and second half-periods refer, for example, to a common periodic synchronisation signal (or clock signal).

Moreover, it may be appreciated that the voltage on the intermediate node INT remains practically constant during the entire operating period of the charge pump circuit.

Figure 2:
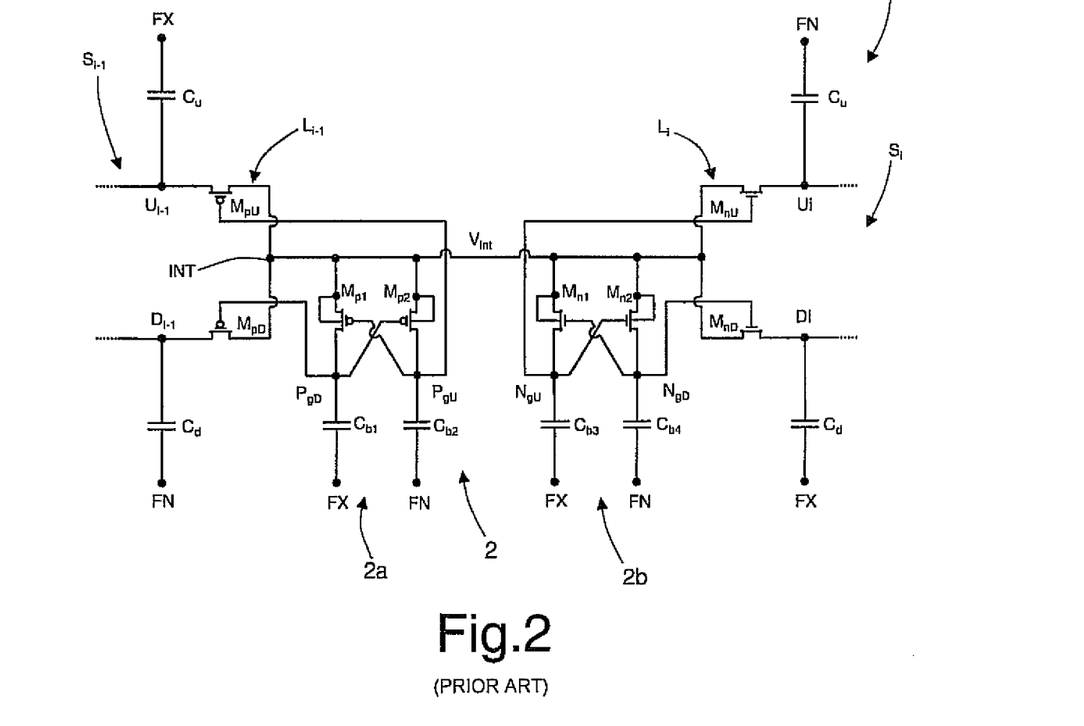
FIG. 2 is a schematic illustration of a second charge pump circuit of a known type.

To improve the performance of the aforesaid charge pump circuit of a latch type, in particular in operating conditions with very low values of the supply voltage (i.e., for limit values lower than the logic supply voltage Vdd, for example, 1 V), in patent application No. EP-A-1 881 589 an improved circuit has been proposed, as shown in FIG. 2 (which, for simplicity of illustration, refers to a single pair of consecutive stages $S_{i-1}$, $S_i$ of the charge pump circuit, which is once again designated by the reference number 1).

In detail, each charge pump stage $S_{i-1}$, $S_i$ comprises once again a first pump capacitor $C_u$ and a second pump capacitor $C_d$, receiving respective low voltage phase signals FX, FN, complementary to one another, and are connected to a respective internal node $U_{i-1}$, $U_i$ and $D_{i-1}$, $D_i$. Each charge pump stage $S_i$ further comprises a latch circuit $L_{i-1}$, $L_i$ with suitable transistors operating as switches (or pass transistors). For simplicity of illustration, only the transistors involved in the transfer of charge between the charge pump stages $S_{i-1}$, $S_i$, in particular between the respective first pump capacitors $C_u$ or second pump capacitors $C_d$ are represented in FIG. 2 (it being altogether evident that similar transistors are, however, present for transfer of charge with respect to the immediately preceding and subsequent stages).

In particular, a first latch transistor $M_{pU}$, of a low voltage PMOS type (here shown only in the charge pump stage $S_{i-1}$) is connected between the internal node $U_{i-1}$ and an intermediate node INT (set between the consecutive charge pump stages $S_{i-1}$ and $S_i$), and has a gate terminal connected to a first control node $P_{gU}$; a second latch transistor $M_{pD}$, of a low voltage PMOS type (in the same charge pump stage $S_{i-1}$) is connected between the internal node $D_{i-1}$ and the intermediate node TNT, and has a gate terminal connected to a second control node $P_{gD}$; a third latch transistor $M_{nU}$, of a low voltage NMOS type (herein shown only in the charge pump stage $S_i$) is connected between the internal node $U_i$ and the intermediate node INT, and has a gate terminal connected to a third control node $N_{gU}$; and a fourth latch transistor $M_{nD}$, of a low voltage NMOS type (in the same stage $S_i$ of the charge pump circuit 1) is connected between the internal node $D_i$ and the intermediate node INT, and has a gate terminal connected to a fourth control node $N_{gD}$.

It should be noted that, for the purposes of operation of the charge pump circuit, the distinction between the drain and source terminals of the various MOS transistors is not important so that they can be referred to generically as "current-conduction terminals".

Moreover, as highlighted previously, it is evident that each latch circuit $L_{i-1}$, $L_i$ further comprises latch transistors for charge sharing with the adjacent stages. For example, the latch circuit $L_i$ further comprises, downstream of the internal node $U_i$ PMOS latch transistors altogether similar to the first and second latch transistors $M_{pU}$, $M_{pD}$.

The charge pump circuit 1 further comprises a stabilization stage 2, which is set between each consecutive pair of charge pump stages $S_{i-1}$, $S_i$, and generates appropriate control signals for the gate terminals of the transistors of the latch circuits $L_{i-1}$, $L_i$. The stabilization stage 2 comprises: a first biasing unit 2a for biasing the gate terminals of the latch transistors $M_{pU}$ and $M_{pD}$ of the charge pump stage $S_{i-1}$; and a second biasing unit 2b for biasing the gate terminals of the latch transistors $M_{nU}$ and $M_{nD}$ of the charge pump stage $S_i$.

In detail, the first biasing unit 2a comprises: a first biasing capacitor $C_{b1}$, having a first terminal receiving the low voltage phase signal FX and a second terminal connected to the second control node $P_{gD}$; a second biasing capacitor $C_{b2}$, having a first terminal receiving the low voltage phase signal FN and a second terminal connected to the first control node $P_{gU}$; a first control transistor $M_{p1}$, of a low voltage PMOS type, which is connected between the intermediate terminal INT and the second control node $P_{gD}$, and has its gate terminal connected to the first control node $P_{gU}$; and a second control transistor $M_{p2}$, of a low voltage PMOS type, which is connected between the intermediate terminal INT and the first control node $P_{gU}$, and has its gate terminal connected to the second control node $P_{gD}$.

Likewise, the second biasing unit 2b comprises: a third biasing capacitor $C_{b3}$, having a first terminal receiving the low voltage phase signal FX and a second terminal connected to the third control node $N_{gU}$; a fourth biasing capacitor $C_{b4}$, having a first terminal receiving the low voltage phase signal FN and a second terminal connected to the fourth control node $N_{gD}$; a third control transistor $M_{n1}$, of a low voltage NMOS type, which is connected between the intermediate terminal INT and the third control node $N_{gU}$, and has its gate terminal connected to the fourth control node $N_{gD}$; and a fourth control transistor $M_{n2}$, of a low voltage NMOS type, which is connected between the intermediate terminal INT and the fourth control node $N_{gD}$, and has its gate terminal connected to the third control node $N_{gU}$.

In general, the pump capacitors $C_u$, $C_d$ may have a same first nominal capacitance; likewise, the first, second, third, and fourth biasing capacitors $C_{b1}$, $C_{b2}$, $C_{b3}$ and $C_{b4}$ may have a same second nominal capacitance. The voltage $V_{int}$ on the intermediate node INT, which remains substantially constant for the entire operating period, is used by the biasing stage 2 for correctly driving switching-on and switching-off of the pass transistors in the latch circuits $L_{i-1}$, $L_1$.

In detail, it is possible to distinguish the two following operating conditions, equivalent to one another, respectively in a first half-period and in a second half-period of the clock signal:

FN=Vdd, FX=0: V($D_{i-1}$) (it should be noted that V(D) and V(U) are the voltages at the corresponding nodes D and U) goes to a high value and V($U_{i-1}$) goes to a low value; likewise V($D_i$) is at a low value, while V($U_i$) is at a high value; in this case, the first control node $P_{gU}$ goes to a high value (equal to $V_{int}$), whereas the second control node $P_{gD}$ goes to a low value (in particular, it decreases by a value equal to the logic supply voltage Vdd with respect to $V_{int}$), thus enabling switching-on of the second latch transistor $M_{pD}$ and switching-off of the first latch transistor $M_{pU}$; in the same half-period, the fourth control node $N_{gD}$ goes to a high value (higher by a value equal to the supply voltage Vdd with respect to $V_{int}$), and the third control node $N_{gU}$ goes to a low value; consequently, the fourth latch transistor $M_{nD}$ switches on, whereas the third latch transistor $M_{nU}$ switches off; in this way, charge sharing is obtained between the two pump capacitors $C_d$, adjacent to one another, connected to the second internal nodes $D_{i-1}$, $D_i$, whereas charge sharing between the two pump capacitors $C_u$, connected to the first internal nodes $U_{i-1}$, $U_i$ is prevented (note that by "charge sharing" is meant a transfer of charge from the previous stage to the next);

FN=0, FX=Vdd: in this case, the circuit operates in a way altogether similar to the previous situation, with the difference that charge sharing occurs between the two pump capacitors $C_u$ connected to the first internal nodes $U_{i-1}$, $U_i$ (in other words, charge transfer involves the top branch of the circuit).

Advantageously, during the two half-periods in which the control nodes $P_{gD}$, $P_{gU}$, $N_{gD}$, $N_{gU}$ go to a high or a low level, the same control nodes remain, throughout charge sharing, always at a substantially constant voltage, of a value such as to enable an effective switching-on, or switching-off, of the latch transistors connected thereto (in other words, any fluctuation in the logic supply voltage Vdd is prevented from possibly jeopardising switching-on/switching-off of the transistors). The control transistors $M_{p1}$, $M_{p2}$, $M_{n1}$, $M_{n2}$ enable the capacitances of the biasing capacitors $C_{b1}$, $C_{b2}$, $C_{b3}$, $C_{b4}$ to be updated to the voltage of the nodes to which they refer and to recover the charge lost for driving the respective latch transistors. The biasing capacitors hence act as "bootstrap" capacitors, effectively driving the gate terminals of the latch transistors.

In particular, even in the case where the logic supply voltage Vdd is particularly low, for example equal to 1 V, the charge pump circuit 1 continues to operate properly, unlike, for example, the circuit of FIG. 1, where instead, the internal nodes $D_i$, $U_i$ may vary their voltage value during the various half-periods (being directly connected to a pump capacitor), up to possibly preventing the corresponding pass transistors from switching on.

Figure 3:
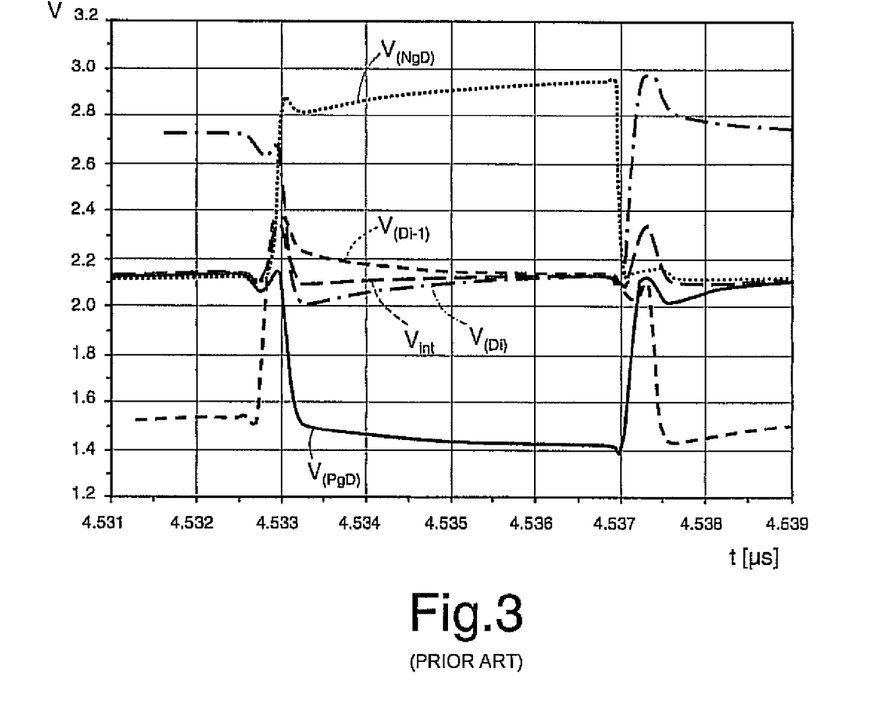
FIG. 3 shows the plot of signals within the circuit of FIG. 2.

FIG. 3 shows the values of some voltages internal to the charge pump circuit 1 during the half-period in which charge sharing takes place between the pump capacitors $C_d$, adjacent to one another, connected to the second internal nodes $D_{i-1}$, $D_i$. In particular, it may be noted that the voltages at the control nodes $P_{gD}$, $N_{gD}$ remain substantially constant during the entire half-period (for example, they do not have a variation of more than 4-6%).

The charge pump circuit 1 of FIG. 2 has several advantages, and in particular enables, using only low voltage transistors, operation at high frequency (for example up to 150 MHz) with good electrical performance. However, the same circuit has a drawback, principally linked to the area occupation (in the integrated implementation on silicon) and to the current consumption.

In this regard, it should be noted that the "pumping" capacitance of the charge pump circuit 1 is given by the following expression:

$$C = \frac{N \cdot I_L}{[(N+1) \cdot Vdd - Vout] \cdot f}$$

where N is the number of stages of the pump; $I_L$ is the current supplied to the load; Vdd is the logic supply voltage (for example, the internal supply voltage of the memory in which the charge pump circuit 1 is used); Vout is the output voltage of the charge pump circuit 1; and f is the clock frequency (which determines the periodicity of operation of the circuit).

Moreover, the current consumption of the charge pump circuit 1, i.e., the current required by the power supply (which supplies the voltage Vdd) is given by the following expression:

$$I(Vdd) = \{(N+1) + \alpha \cdot [N^2/(N+1) \cdot Vdd - Vout] \cdot Vdd\} \cdot I_L$$

where $\alpha$ is the ratio between the value of the parasitic capacitance of the circuit and the value of the pumping capacitance defined previously.

It may thus be appreciated that, if supply voltages of a low value (for example, 1 V) are used for operation, then the need arises to have higher pumping capacitances and a greater number of stages in the charge pump circuit to reach desired values for the output voltage and the current supplied to the load; in turn, this involves a larger area occupation and a higher current consumption.

It should be noted that, given that it is necessary in all cases to satisfy the specifications of current required by the load, the charge pump circuit is in general sized at the minimum supply voltage; it follows that the problem highlighted above is particularly felt.

SUMMARY OF THE INVENTION

An object of the present invention is to provide a charge pump circuit that will address, at least in part, the problems highlighted above, in particular as regards the requirements of current consumption and area occupation.

According to the present invention, a charge pump circuit is provided, a charge pump circuit comprising a plurality of charge pump stages cascaded to one another. Each charge pump stage includes a first pump capacitor connected to a first internal node and receiving a first high voltage phase signal, and a second pump capacitor connected to a second internal node and receiving a second high voltage phase signal, complementary with respect to the first high voltage phase signal. A first transfer transistor is coupled between the first internal node and an intermediate node set between the charge pump stage and a subsequent charge pump stage of the charge pump circuit, and a second transfer transistor is coupled between the second internal node and the intermediate node, the first and second transfer transistors being alternately operable, in respective half-periods of operation of said circuit.

The first high voltage phase signal and the second high voltage phase signal have voltage dynamics higher than a maximum voltage sustainable by the first transfer transistor and the second transfer transistor. The charge pump circuit includes, for each charge pump stage, a protection stage set between the first internal node and the second internal node and, respectively, the first transfer transistor and the second transfer transistor in such a way as to protect the first transfer transistor and the second transfer transistor from overvoltages present on the first internal node and second internal node.

BRIEF DESCRIPTION OF THE DRAWINGS

For a better understanding of the present invention, preferred embodiments thereof are now described, purely by way of non-limiting example, with reference to the attached drawings, wherein.

DETAILED DESCRIPTION OF THE PREFERRED EMBODIMENTS

The present invention stems from the realization, by the present applicant, that the applications where charge pump circuits are employed usually have, in addition to the logic supply voltage Vdd, also an external supply voltage, having a decidedly wider range of values. For example, in the case of use in flash-memory devices, an external supply voltage Vcc is available, for example with values between 1.65 V and 5.5 V. The present invention hence provides a solution for supplying a charge pump circuit having only low voltage transistors (for example, the circuit of FIG. 2) with a power supply higher than the logic supply voltage Vdd, without the risk of damaging or even destroying the circuit, and in particular the oxides of the low voltage transistors. The present applicant has, in fact, noted that the use of a higher supply voltage would enable reduction of the area occupation and of the current consumption, at the same time safeguarding the advantages of simplicity of construction and of high operating frequency linked to charge pump circuits of a two-phase latch type, which use only low voltage transistors.

Figure 4:
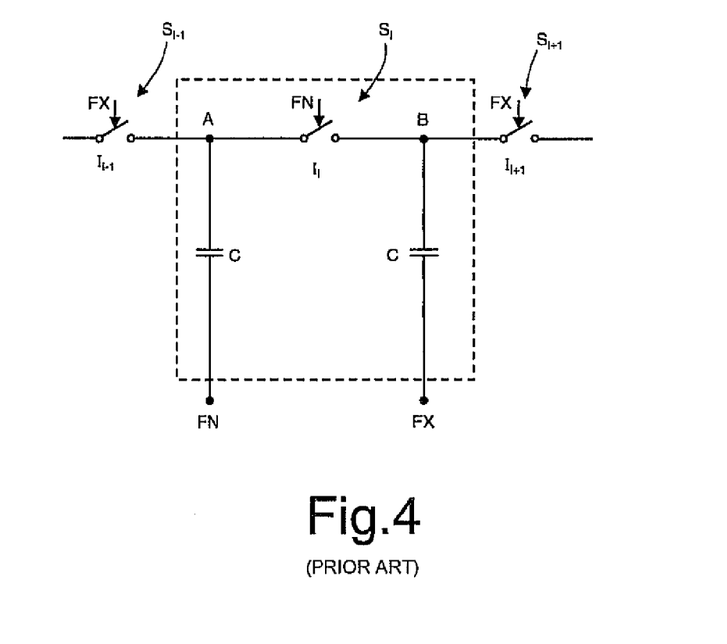
FIG. 4 shows a functional diagram of the circuit of FIG. 2.

To determine a maximum applicable voltage value, the first step is to assess the differences of potential between the various nodes internal to the charge pump circuit (for example, the circuit of FIG. 2), considering, for simplicity, a single stage $S_i$, which is shown in an extremely simplified way in FIG. 4.

In particular, FIG. 4 shows two pump capacitors C (which receive the low voltage phase signals FN and FX), for example coinciding with the pump capacitors $C_d$ of the bottom branch of the charge pump circuit, and two terminals, input A and output B, of the stage $S_i$, for example coinciding with the terminals $D_{i-1}$ and $D_i$ of the same bottom branch of the charge pump circuit. Moreover, FIG. 4 also represents as a whole with a single switch Ii the various pass transistors of the stage $S_i$ (and a similar representation is made for the switches $I_{i-1}$ and $I_{i+1}$ of the previous stage $S_{i-1}$ and subsequent stage $S_{i+1}$.

The aforesaid FIG. 4 refers in particular to a first operating condition, coinciding with end of charge sharing (the so-called "End Sharing", i.e., end of transfer of charge from one stage to the next), in which the CMOS switches of the stage $S_i$ and of the previous and subsequent stages are open. In this operating condition, intuitively, the difference of potential between the terminals A and B is zero:

$$V_{AB}(\text{End\_Sh}) = 0$$

During charge sharing, the voltage at the input terminal A drops by an amount $\Delta V$ $$\Delta V = \frac{I_L T}{C}$$

where $I_L$ is the current supplied to the load, C is the capacitance of the pump capacitors, and T is the period of the clock signal.

During charge sharing, moreover, the voltage at the output terminal B increases by the same amount $\Delta V$; it follows that, at the start of charge sharing, the following expression applies:

$$V_{AB}(\text{Start\_Sh}) = 2 \cdot \Delta V$$

Starting from the instant of end of charge sharing (or of start of the subsequent step of no charge sharing), the low voltage phase signals FX and FN switch, and consequently the voltage at the input terminal A drops by an amount equal to the supply voltage Vdd, whereas the voltage at the output terminal B increases by the same amount. The following expression hence applies:

$$V_{AB}(\text{Start\_NoSh}) = 2 \cdot Vdd$$

In this time interval, there is no charge sharing in the stage $S_i$ (as regards, for example, the bottom branch of the circuit), whereas there is charge sharing in the adjacent stages $S_{i-1}$ and $S_{i+1}$. Consequently, the pump capacitor connected to the input terminal A receives charge from the previous stage $S_{i-1}$, and the pump capacitor connected to the output terminal B yields charge to the subsequent stage $S_{i+1}$.

At the end of the time interval of no charge sharing, the voltage at the input terminal A has hence increased by $\Delta V$, whereas the voltage at the output terminal B has dropped by $\Delta V$. Consequently, $$V_{AB}(\text{End\_NoSh}) = 2 \cdot Vdd - 2 \cdot \Delta V$$

From the above considerations, it follows that the maximum difference of potential between the nodes internal to the charge pump circuit takes place at start of the time interval of no charge sharing ("Start No Sharing"), and is equal to 2·Vdd (i.e., to twice the logic supply voltage Vdd).

Applying now these considerations to the charge pump circuit 1 of FIG. 2 (see also the previous discussion), it follows that the maximum difference of potential takes place between the internal nodes $D_{i-1}$ and $D_i$. In particular, during the aforesaid time interval (of very short duration) of start of the step of no charge sharing, the latch transistors $M_{pD}$ and $M_{nD}$ are both open (or off), whereas the latch transistors $M_{pU}$ and $M_{nU}$ are both closed (or on). The latter hence maintain the intermediate node INT at an intermediate voltage between the voltages present on the two internal nodes $U_{i-1}$ and $U_i$. Consequently, the result is that the difference of potential between the source and drain terminals of the latch transistors $M_{pD}$ and $M_{nD}$ is at most equal to Vdd (hence not causing damage to the low voltage transistors).

As may be readily understood, if the supply voltage used for the charge pump circuit (in particular for defining the dynamics of the low voltage phase signals FX, FN) were higher than Vdd, the effect of this voltage would fall entirely on the oxides of the latch transistors $M_{pD}$ and $M_{nD}$, jeopardizing operation of the same transistors up to their possible destruction. Similar considerations apply to the latch transistors $M_{pU}$ and $M_{nU}$, during the step of start of no charge sharing between the capacitors $C_U$ of the top branch of the charge pump circuit 1.

An aspect of the present invention consequently envisages modifying the charge pump circuit (in particular, the charge pump circuit 1 illustrated in FIG. 2, of the two-phase latch type), introducing an appropriate protection stage, having the function of protecting the latch transistors from overvoltages. A further aspect of the present invention envisages in fact supplying the charge pump circuit with a supply voltage of a value higher than the logic supply voltage Vdd (the latter being the maximum voltage sustainable by low voltage latch transistors).

Figure 5:
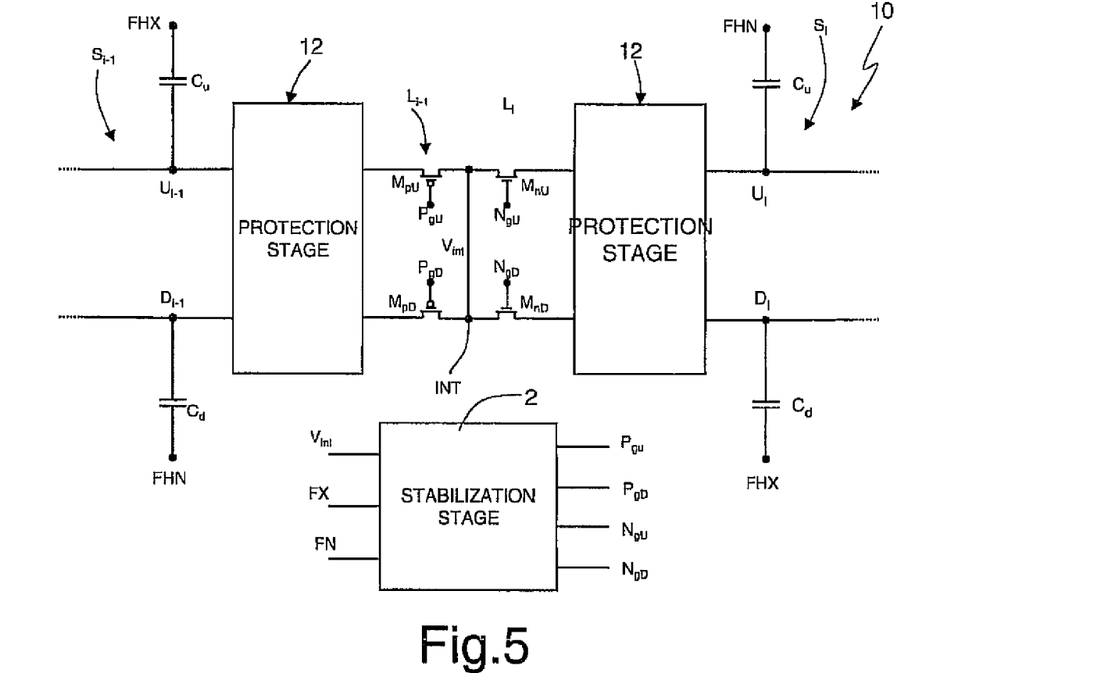
FIG. 5 is a schematic illustration of a charge pump circuit, according to one embodiment of the present invention.

In detail, as initially shown in FIG. 5, a charge pump circuit, here designated by 10 (and illustrated in a schematic and simplified way), has a structure substantially similar to that of the circuit of a two-phase latch type shown in FIG. 2, and in particular has a plurality of charge pump stages $S_1, \ldots, S_N$, each of which comprises a first pump capacitor $C_u$, connected to a first internal node $U_i$ (considering the generic i-th stage), associated to a top branch of the circuit, and a second pump capacitor $C_d$, connected to a second internal node $D_i$, associated to a bottom branch of the circuit (the two, top and bottom, branches being involved in alternating half-periods by the transfer of charge between the corresponding pump capacitors).

Each charge pump stage $S_1, \ldots, S_N$ further comprises a respective latch circuit $L_1, \ldots, L_N$, provided with latch transistors, appropriately controlled so as to enable transfer of charge from one stage to the next, and in particular between the first pump capacitors $C_u$ of the top branch, in a first operating half-period (referring to a clock signal), and between the second pump capacitors $C_d$ of the bottom branch, in the second operating half-period of the clock signal. By way of example (in a way similar to what is illustrated in FIG. 2), FIG. 5 shows only the latch transistors that enable transfer of charge from the charge pump stage to the next charge pump stage $S_i$, and in particular the first latch transistor $M_{pU}$, of a low voltage PMOS type, the second latch transistor $M_{pD}$, which is also of a low voltage PMOS type, the third latch transistor $M_{nU}$, of a low voltage NMOS type, and the fourth latch transistor $M_{nD}$, which is also of a low voltage NMOS type.

The charge pump circuit 10 further comprises (in a way substantially similar to what has been described with reference to FIG. 2) a stabilization stage, designated once again by 2, which is set between each consecutive pair of charge pump stages $S_{i-1}$, $S_i$, and generates appropriate control signals for the gate terminals of the transistors of the latch circuits $L_{i-1}$, $L_i$. As shown schematically in FIG. 5, the stabilization stage 2 receives at input the voltage $V_{int}$ present on the intermediate node INT between the charge pump stages $S_i$, and the low voltage phase signals FX, FN (operating in the low voltage range, or logic voltage, comprised between 0 V, or ground, and Vdd, for example with values in the range between 1 V and 1.35 V), and supplies at output to the first and second control nodes $P_{gU}$, $P_{gD}$ the control signals for biasing the gate terminals of the latch transistors and $M_{pU}$ and $M_{pD}$, to the third and fourth control nodes $N_{gU}$, $N_{gD}$ the control signals for biasing the gate terminals of the latch transistors $M_{nU}$ and $M_{nD}$.

According to one aspect of the invention, the charge pump circuit 10 is supplied with a high supply voltage VddH, higher than the logic supply voltage Vdd, for example comprised between 1.65 V and 5.5 V. In particular, high voltage phase signals FXH, FNH (operating in the high voltage range comprised between 0 V, or ground, and the high supply voltage VddH) are supplied to the pump capacitors $C_u$, $C_d$ (in a way alternating in the various successive stages, as indicated previously). The high voltage phase signals FXH, FNH have a high or low value corresponding to that of the low voltage phase signals FX, FN, given that they are shifted towards high voltage values with respect to the latter.

Moreover, the charge pump circuit 10 comprises, for each charge pump stage $S_i$, a protection stage 12, set between the internal nodes $U_i$, $D_i$ and the latch transistors $M_{pU}$, $M_{nU}$, $M_{pD}$, $M_{nD}$ coupled to the same internal nodes $D_i$, $D_i$ in such a way as to protect the latch transistors from overvoltages (in particular, deriving from use of the high supply voltage VddH, which, as highlighted previously, would otherwise fall entirely on the oxides of the same latch transistors).

Figure 6:
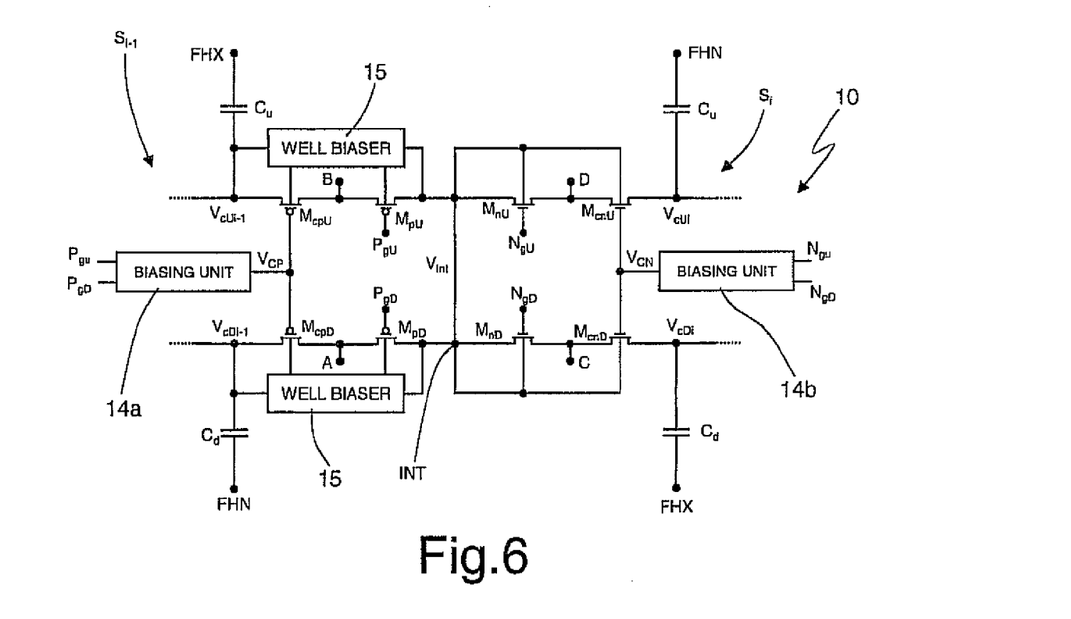
FIGS. 6-8 are schematic diagrams illustrating, with increasing level of detail, a circuit embodiment of the circuit of FIG. 5.

In detail, and as shown in FIG. 6, each protection stage 12 comprises protection transistors, connected between a respective internal node $U_i$, $D_i$ and a respective latch transistor $M_{pU}$, $M_{nU}$, $M_{pD}$, $M_{nD}$, in a so-called "cascode" configuration (i.e., cascaded and traversed, in use, by the same current).

In particular, FIG. 6 (which once again refers only to the portion of the charge pump circuit 10 for transfer of charge between the charge pump stage $S_{i-1}$ and the subsequent stage $S_i$) shows: a first protection transistor $M_{cpU}$, of a low voltage PMOS type, which is connected between the first internal node $U_{i-1}$ of the charge pump stage $S_{i-1}$ and a node B, to which the first latch transistor $M_{pU}$ (operating once again as pass transistor) is also connected; a second protection transistor $M_{cpU}$, of a low voltage PMOS type, which is connected between the second internal node $D_{i-1}$ of the charge pump stage $S_{i-1}$ and a node A, to which the second latch transistor $M_{pD}$ is also connected; a third protection transistor $M_{cnU}$, of a low voltage NMOS type, which is connected between the first internal node $U_i$ of the charge pump stage $S_i$ and a node D, to which the third latch transistor $M_{nU}$ is also connected; and a fourth protection transistor $M_{cnD}$, of a low voltage NMOS type, which is connected between the second internal node $D_i$ of the charge pump stage $S_i$ and a node C, to which the fourth latch transistor $M_{nD}$ is also connected (it should be noted that the protection transistors have the same type of channel, n or p, as that of the respective latch transistor to which they are connected in cascade configuration).

The gate terminals (or control terminals) of the first and second protection transistors $M_{cpU}$, $M_{cpD}$ (having the same type of channel p), are connected together and are moreover connected to a first gate-biasing unit 14a of the protection stage 12, which supplies a first biasing voltage $V_{cp}$, of an appropriate value. Likewise, the gate terminals (or control terminals) of the third and fourth protection transistors $M_{cnU}$, $M_{cnD}$ (having the same type of channel n), are connected together and are moreover connected to a second gate-biasing unit 14b of the protection stage 12, which supplies a second biasing voltage $V_{cn}$, of an appropriate value. The first gate-biasing unit 14a has moreover inputs connected to the first and second control nodes $P_{gU}$, $P_{gD}$, whilst the second gate-biasing unit 14b has inputs connected to the third and fourth control nodes $N_{gU}$, $N_{gD}$.

In particular, as will be described in detail hereinafter, the protection stage 12 is configured so as to generate the first biasing voltage $V_{cp}$ of a constant value (during the entire period of the clock signal), equal to the minimum voltage that can be assumed by the first and second control nodes $P_{gU}$, $P_{gD}$, which is in particular equal to $(V_{int}-Vdd)$, and is moreover configured so as to assign to the second biasing voltage $V_{cn}$ a constant value equal to the maximum voltage that can be assumed by the third and fourth control nodes $N_{gU}$, $N_{gD}$, which is equal to $(V_{int}+Vdd)$.

Intuitively, this choice of the values of the biasing voltages enables effective switching-on/switching-off of the protection transistors (of a PMOS and NMOS type), i.e., issuing of a command to the transistors for complete switching-on/complete switching-off.

As shown in the same FIG. 6, the protection stage 12 further comprises a well-biasing unit 15, of a known type that is not described in detail, designed to bias at the same biasing voltage the well terminals of the protection and latch PMOS transistors, coupled to one another (and to the first internal node $U_i$ and to the second internal node $D_i$). The well terminals of the protection and latch transistors of an NMOS type are, instead, connected to one another by an electrical connection line.

Some considerations are now made on the maximum values of the voltages present within the charge pump circuit 10, in particular to define the maximum value of the high supply voltage VddH, which can be used in the same circuit.

Figure 7:
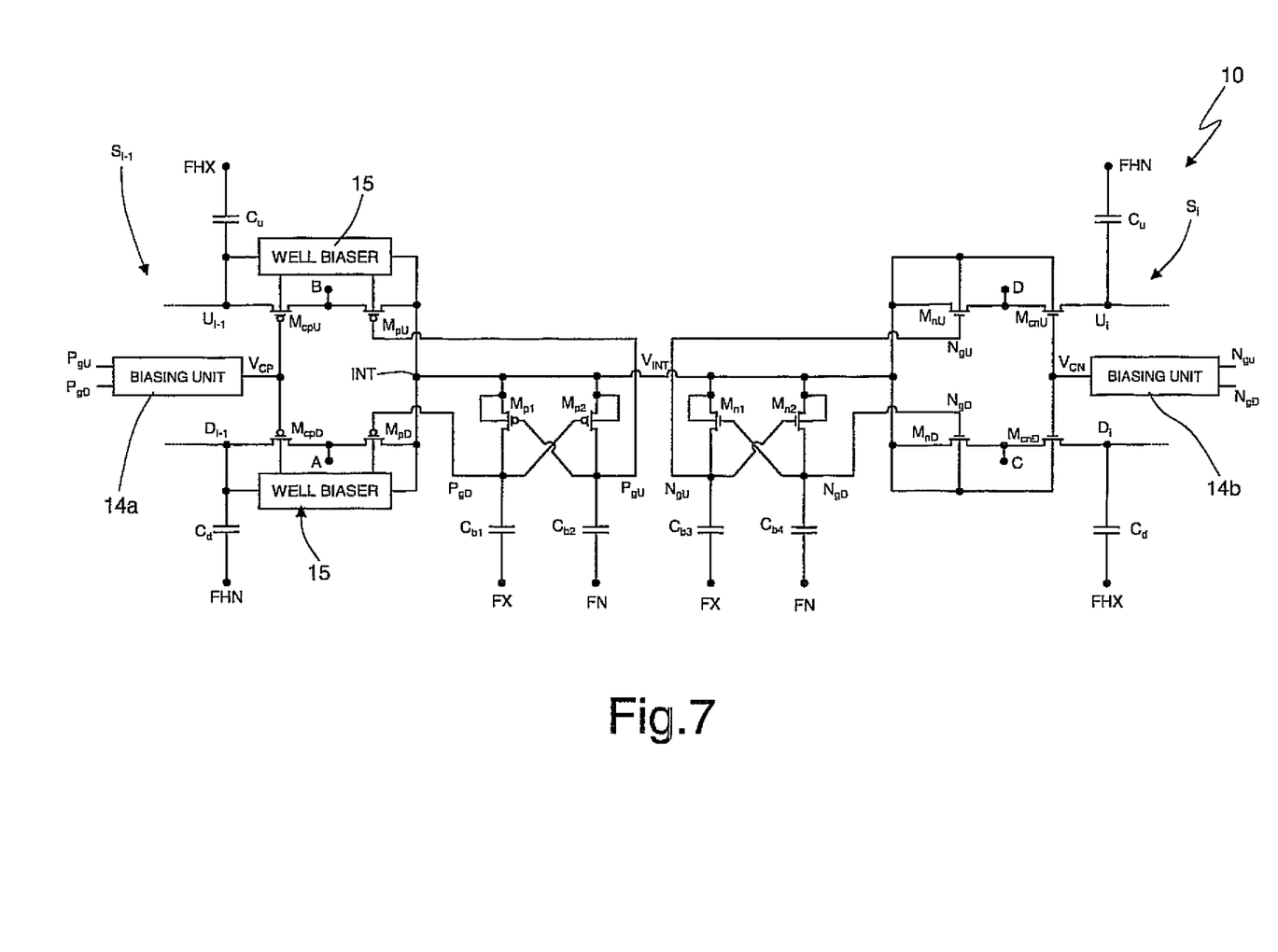

In particular, reference is here made to FIG. 7, which shows in greater detail the circuit configuration of the charge pump stages $S_{i-1}$, $S_i$ and of the protection stage 12 (as it has already been described in detail with reference to FIG. 2). It should be noted that the charge pump circuit 10 hence works with two different supply voltages (and respective pairs of phase signals): the voltage VddH for supplying the high voltage phase signals FHX and FHN; and the voltage Vdd for supplying the low voltage phase signals FX and FN.

In particular, given that the maximum difference of potential between the internal nodes (for example, the nodes $D_i$ and $D_{i-1}$) of the charge pump circuit 10 takes place during the "Start No Sharing" step, the circuit is examined once again during this operating step (for example, considering the charge sharing between the capacitors $C_d$ of the bottom branch of the circuit). Since the high voltage phase signals FXH and FNH are supplied with the voltage VddH, the maximum difference of potential between the nodes $D_i$ and $D_{i-1}$ is now equal to 2VddH, as may be readily appreciated.

The voltages of the internal nodes of the bottom circuit branch during this operating step are summed up in the table below.

TABLE 1

| | |
|---|---|
| $V(D_{i-1})$ | $V_{int} - VddH$ |
| $V_{cp}$ | $V_{int} - Vdd$ |
| $V(A)$ | $V_{int} - Vdd + V_{th}$ |
| $V(P_{gD})$ | $V_{int}$ |
| $V(int)$ | $V_{int}$ |
| $V(N_{gD})$ | $V_{int}$ |
| $V(C)$ | $V_{int} + Vdd - V_{th}$ |
| $V_{cN}$ | $V_{int} + Vdd$ |
| $V(D_i)$ | $V_{int} + VddH$ | where $V_{th}$ is the threshold voltage of the MOS transistors.

The maximum voltage drops take place on the protection transistors (in the case of the bottom branch, the second and fourth protection transistors $M_{cpD}$ and $M_{cnD}$), which are thus important. It is, instead, evident that in all the other cases the differences of potential are lower than Vdd so as not to create any risk of breakdown of the junction oxides.

Regarding the second protection transistor $M_{cpD}$, to prevent breakdown of the oxides, the condition to be imposed is that the voltage drop across the gate and drain terminals should be lower than Vdd (it is recalled that all the transistors are in fact low voltage transistors; namely, they are able to withstand, without breakdown, voltages not higher than the logic supply voltage Vdd); it follows that the following relation is to be verified:

$$V_{cp} - V(D_{i-1}) \leq Vdd$$

and accordingly:

$$(V_{int} - Vdd) - (V_{int} - VddH) \leq Vdd$$

It follows that the maximum voltage that can be assigned to the high supply voltage VddH is equal to 2Vdd (in other words, the relation VddH≤2Vdd must be satisfied).

Likewise, as regards the fourth protection transistor $M_{cnD}$, the condition that the voltage drop across the gate and drain terminals should be lower than Vdd leads to the following relation:

$$V(D_i)-V_{cn} \leq Vdd$$

and accordingly:

$$(V_{int}+VddH)-(V_{int}+Vdd) \leq Vdd$$

Also in this case, the high supply voltage VddH is not to be higher than 2Vdd (VddH≤2Vdd).

Therefore, imposing, for example, that the voltage VddH is equal to $2Vdd_{min}$ (where $Vdd_{min}$ is the minimum value that can be assumed, during operation of the charge pump circuit 10, by the logic supply voltage Vdd, taking into account, for example, its possible fluctuations), it is possible to operate always in safety conditions.

Figure 8:
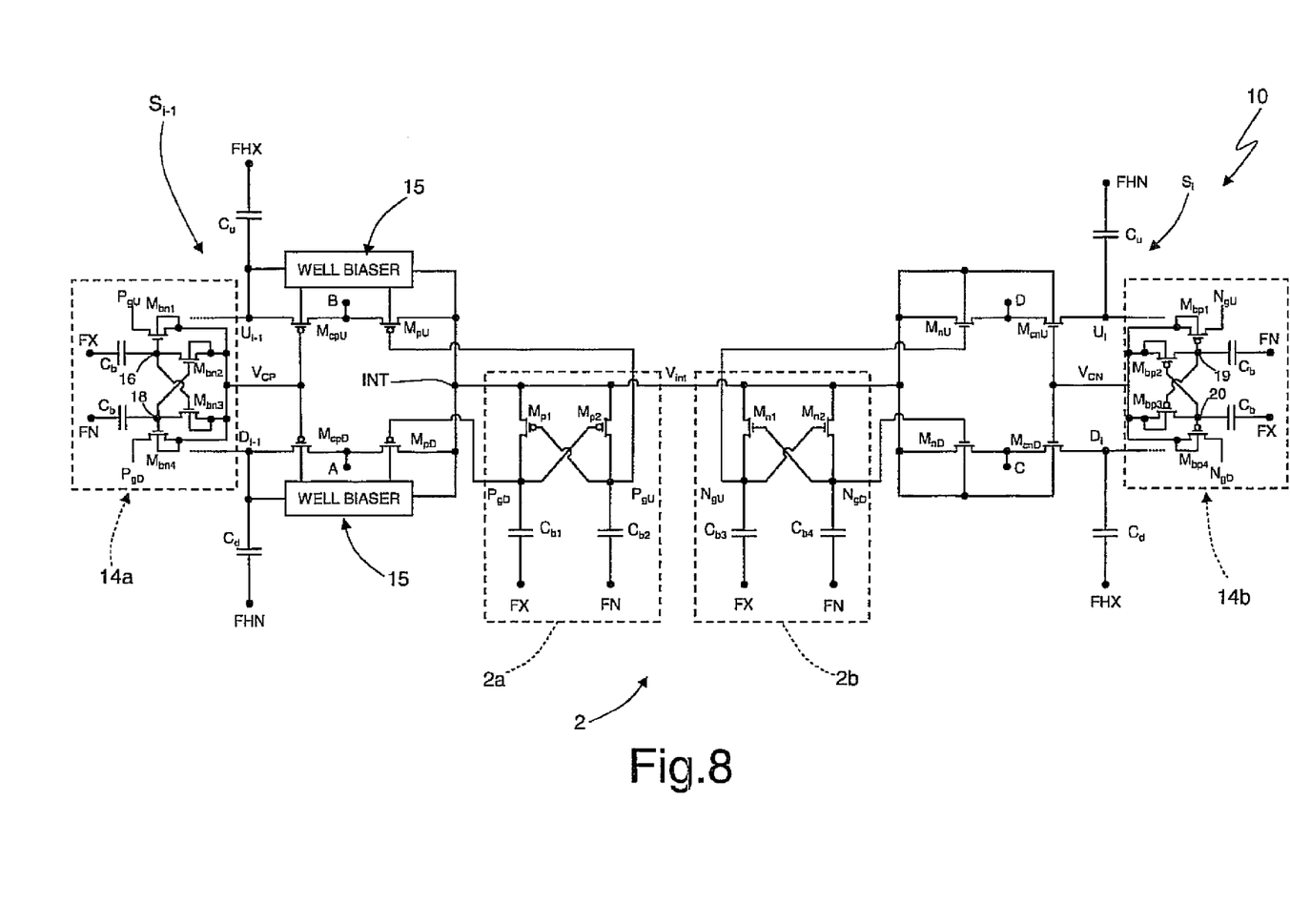

FIG. 8 shows the overall diagram of the charge pump circuit 10 (once again with reference to just the portions envisaged for transfer of charge from one stage $S_{i-1}$ to the next stage $S_i$), showing in particular a possible circuit implementation of the gate-biasing units 14a, 14b of the protection stage 12. In detail, the first gate-biasing unit 14a comprises: a first buffer capacitor $C_b$, which receives on a first terminal the first low voltage phase signal FX and has the second terminal connected to a node 16, internal to the first gate-biasing unit 14a; and a second buffer capacitor $C_b$, which receives on a first terminal the second low voltage phase signal FN and has the second terminal connected to a node 18, internal to the first gate-biasing unit 14a.

The first gate-biasing unit 14a further comprises: a first biasing transistor $M_{bn1}$, of a low voltage NMOS type, which has a first current-conduction terminal connected to the first control node $P_{gU}$ and a second current-conduction terminal connected to a biasing output of the first gate-biasing unit 14, present on which is the first biasing voltage $V_{cp}$, and has its control terminal (or gate terminal) connected to the node 16; a second biasing transistor $M_{bn2}$, of a low voltage NMOS type, which is connected between the node 16 and the biasing output and has its control terminal (or gate terminal) connected to the node 18; a third biasing transistor $M_{bn3}$, of a low voltage NMOS type, which is connected between the node 18 and the biasing output and has its control terminal (or gate terminal) connected to the node 16 (the second and third biasing transistors $M_{bn2}$, $M_{bn3}$ are hence connected in latch configuration); and a fourth biasing transistor $M_{bn4}$, of a low voltage NMOS type, which has a first current-conduction terminal connected to the second control node $P_{gD}$ and a second current-conduction terminal connected to the biasing output, and has its control terminal (or gate terminal) connected to the node 18.

Operation of the first biasing unit 14a is such that the first biasing voltage $V_{cp}$ present on the biasing output is constant throughout the operating period of the charge pump circuit 10 and equal to the minimum voltage present on the control nodes $P_{gU}$ and $P_{gD}$. In detail, during a first half-period of charge sharing between the capacitors $C_U$ of the top branch of the circuit, the following conditions are verified (it should be noted that "ON" and "OFF" indicate, respectively, the condition of switching-on and the condition of switching-off of the transistors):

FHN=Gnd; FHX=VddH

FN=Gnd; FX=Vdd $V(P_{gD})=V_{int}$; $V(P_{gU})=V\text{int}-Vdd$ $M_{p1} \to$ ON; $M_{p2} \to$ OFF $M_{cpU} \to$ ON; $M_{cpD} \to$ OFF $M_{bn2} \to$ OFF; $M_{bn4} \to$ OFF $M_{bn3} \to$ ON; $M_{bn1} \to$ ON accordingly, it follows that the first biasing voltage $V_{cp}$ is:

$$V_{cp}=V(P_{gU})=V_{int}-Vdd$$

Likewise, in a second half-period of charge sharing between the capacitors $C_D$ of the bottom branch of the circuit, the following respective conditions are verified:

FHN=VddH; FHX=Gnd

FN=Vdd; FX=Gnd $V(P_{gD})=V_{int}-Vdd$; $V(P_{gU})=V_{int}$ $M_{p1} \to$ OFF; $M_{p2} \to$ ON $M_{cpU} \to$ OFF; $M_{cpD} \to$ ON $M_{bn2} \to$ ON; $M_{bn4} \to$ ON $M_{bn3} \to$ OFF; $M_{bn1} \to$ OFF and it follows that the first biasing voltage $V_{cp}$ is once again:

$$V_{cp}=V(P_{gD})=V_{int}-Vdd$$

The first biasing voltage $V_{cp}$, as desired, is therefore constantly equal to the expression $V_{int}-Vdd$, for the entire period of operation of the charge pump circuit 10.

In a substantially similar way, the second gate-biasing unit 14b comprises: a respective first buffer capacitor $C_b$, which receives on a first terminal the first low voltage phase signal FN and has the second terminal connected to a node 19, internal to the second gate-biasing unit 14b; and a respective second buffer capacitor $C_b$, which receives on a first terminal the second low voltage phase signal FX and has the second terminal connected to a node 20, internal to the second gate-biasing unit 14b.

The second gate-biasing unit 14b further comprises: a respective first biasing transistor $M_{bp1}$, of a low voltage PMOS type, which has a first current-conduction terminal connected to the third control node $N_{gU}$ and a second current-conduction terminal connected to a biasing output of the second gate-biasing unit 14b, present on which is the second biasing voltage $V_{cn}$, and has its control terminal (or gate terminal) connected to the node 19; a respective second biasing transistor $M_{bp2}$, of a low voltage PMOS type, which is connected between the node 19 and the biasing output and has its control terminal (or gate terminal) connected to the node 20; a respective third biasing transistor $M_{bp3}$, of a low voltage PMOS type, which is connected between the node 20 and the biasing output and has its control terminal (or gate terminal) connected to the node 19 (the second and third biasing transistors $M_{bp2}$, $M_{bp3}$ are hence connected in latch configuration); and a fourth biasing transistor $M_{bp4}$, of a low voltage PMOS type, which has a first current-conduction terminal connected to the fourth control node $N_{gD}$ and a second current-conduction terminal connected to the biasing output, and has its control terminal (or gate terminal) connected to the node 20.

Operation of the second biasing unit 14b is such that the second biasing voltage $V_{cn}$ present on the biasing output is constant during the entire period, and equal to the maximum voltage present on the control nodes $N_{gU}$ and $N_{gD}$.

In detail, in a first half-period of charge sharing between the capacitors $C_U$ of the top branch of the circuit, the following conditions are valid:

$$FHN=Gnd; FHX=VddH$$

$$FN=Gnd; FX=Vdd$$

$$V(N_{gD})=V_{int}; V(N_{gU})=V_{int}-Vdd$$

$$M_{n1} \rightarrow OFF; M_{n2} \rightarrow ON$$

$$M_{cnU} \rightarrow ON; M_{cnD} \rightarrow OFF$$

$$M_{bp2} \rightarrow OFF; M_{bp4} \rightarrow OFF$$

$$M_{bp3} \rightarrow ON; M_{bp1} \rightarrow ON$$

and it follows that the second biasing voltage $V_{cn}$ is:

$$V_{cn}=V(N_{gU})=V_{int}+Vdd$$

Likewise, in a second half-period of charge sharing between the capacitors $C_D$ of the bottom branch of the circuit, the following respective conditions are valid:

$$FHN=VddH; FHX=Gnd$$

$$FN=Vdd; FX=Gnd$$

$$V(N_{gD})=V_{int}+Vdd; V(N_{gU})=V_{int}$$

$$M_{n1} \rightarrow OFF; M_{n2} \rightarrow ON$$

$$M_{cnU} \rightarrow OFF; M_{cnD} \rightarrow ON$$

$$M_{bp2} \rightarrow ON; M_{bp4} \rightarrow ON$$

$$M_{bp3} \rightarrow OFF; M_{bp1} \rightarrow OFF$$

and it follows that the second biasing voltage $V_{cn}$ is again:

$$V_{in}=V(N_{gD})=V_{int}+Vdd$$

The second biasing voltage $V_{cn}$, as desired, is hence constantly equal to the expression $V_{int}+Vdd$ for the entire period of operation of the charge pump circuit 10.

Basically, the circuit configuration of the biasing units 14a, 14b is such as to exploit the same low voltage phase signals FX, FN being sent to the protection stage 12 in order to control opening and closing of the biasing transistors ($M_{bn1}$, $M_{bn4}$, $M_{bp1}$, $M_{bp4}$) and consequent transfer at the output of the lowest/highest of the signals present on the control nodes $P_{gD}$, $P_{gU}$ or $N_{gD}$, $N_{gU}$ (in particular, the lowest of the signals present on the control nodes $P_{gD}$, $P_{gU}$, as regards the first biasing unit 14a, and the highest of the signals present on the control nodes $N_{gD}$, $N_{gU}$, as regards the second biasing unit 14b). Moreover, the further biasing transistors ($M_{bn2}$, $M_{bn3}$, $M_{bp2}$, $M_{bp3}$) are exploited to connect alternately the biasing capacitors $C_b$ to the output of the biasing units 14a, 14b so as to recover the charge lost in the previous half-period for driving the biasing transistors ($M_{bn1}$, $M_{bn4}$, $M_{bp1}$, $M_{bp4}$). The nodes 16, 18, 19 and 20 are hence always at voltage values such as to open/close in an effective and complete way the transistors the gate terminals of which are connected thereto. For example, a high voltage on the node 16 of the first biasing unit 14a enables at the same time closing of the biasing transistors $M_{bn1}$ and $M_{bn3}$, and hence both the transfer of the signal present on the control node $P_{gU}$ to the output and refresh at the same output voltage of the biasing capacitor $C_b$ belonging to the other node 18; instead, the biasing transistors $M_{bn2}$ and $M_{bn4}$ in the same half-period are open, given the complementary values of the low voltage phase signals FX, FN.

Figure 9:
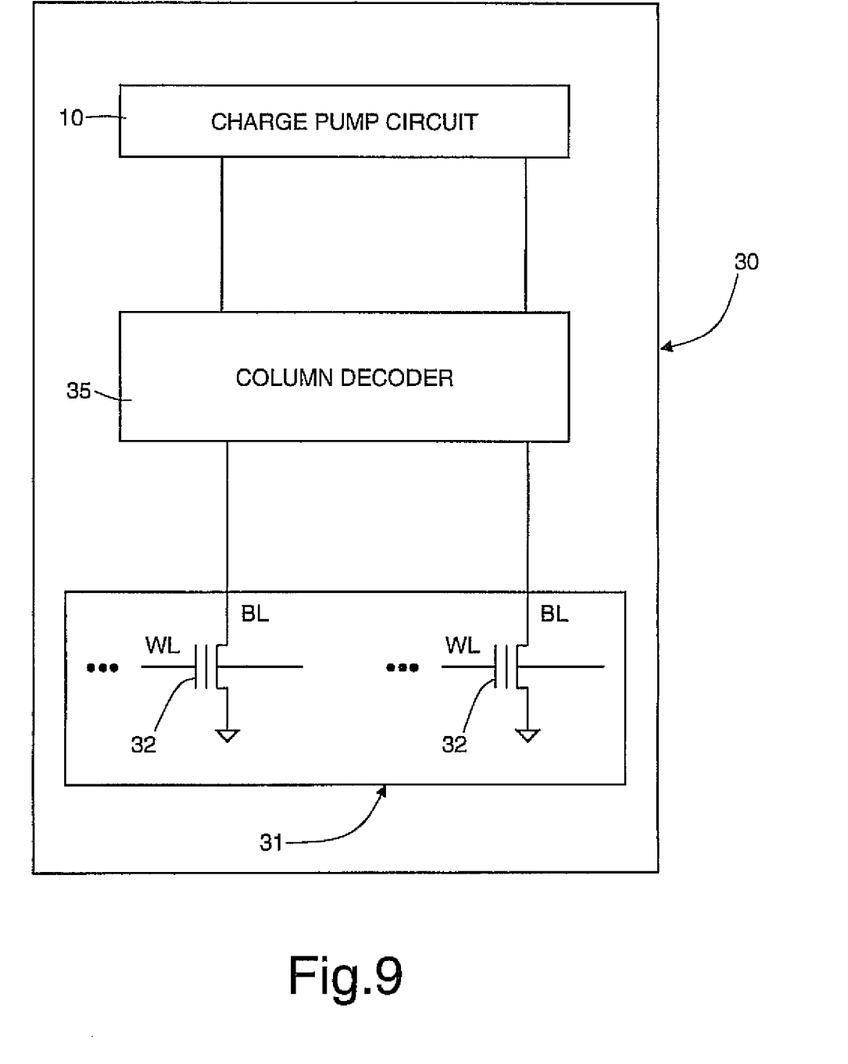
FIG. 9 shows a block diagram of a storage device incorporating the circuit of FIG. 5.

As shown schematically in FIG. 9, the charge pump circuit 10 can be advantageously used in a memory device 30, for example of a CMOS flash type, comprising an array 31 of memory cells 32. In a per-se known manner, the memory cells 32 have their gate terminal connected to a respective wordline WL and their drain terminal connected to a respective bitline BL. In the schematic representation shown, the charge pump circuit 10 is connected to the drain terminals of the memory cells 32, through interposition of a column decoder 35.

Moreover, the load of the charge pump circuit 10 is in this case basically constituted by the capacitance of the bitlines BL of the memory array 31. The charge pump circuit 10 is in this case used for generating the high programming (writing/erasure) and reading voltages required for the memory cells 32.

The advantages of the charge pump circuit according to the present invention are clear from the foregoing description. In any case, it is once again emphasized that the use of just low voltage transistors enables operation at high frequencies (even up to 150 MHz). Moreover, it is possible to use high supply voltages (higher than the logic supply voltage Vdd, or, in other words, than the maximum voltage sustainable by the aforesaid low voltage transistors), without incurring risks of breakdown of the oxides of the transistors used in the circuit.

In particular, this makes it possible to achieve good electrical performance, without increasing the area occupation and the current consumption, as is instead required for traditional solutions. Given the same output voltage and current supplied to the load, it is hence possible to use pump capacitors with lower capacitance (and of smaller dimensions), and a smaller number of charge pump stages.

Finally, it is clear that modifications and variations may be made to what is described and illustrated herein, without thereby departing from the scope of the present invention, as defined in the annexed claims.

In particular, it is evident that the charge pump circuit finds advantageous, though not exclusive, application within a memory device, for generating the high voltages required for the programming and reading operations; other uses can be equally envisaged, in all those cases where it is necessary to generate a boosted voltage starting from a lower voltage value.

Moreover, it is evident that circuit modifications may be envisaged, which do not alter the general operating principle of the circuit. For example, the gate-biasing units 14a, 14b in the protection stage 12 may have a different configuration, which will enable in any case generation of the desired values for the biasing voltages $V_{cp}$ and $V_{cn}$.

That which is claimed:

1. A charge pump circuit comprising:
a plurality of charge pump stages cascaded to one another, each charge pump stage comprising
a first pump capacitor coupled to a first internal node and configured to receive a first high voltage phase signal, and a second pump capacitor coupled to a second internal node and configured to receive a second high voltage phase signal, complementary with respect to the first high voltage phase signal,
a first transfer transistor coupled between the first internal node and an intermediate node between said charge pump stage and a subsequent charge pump stage of said plurality of cascaded charge pump stages, and a second transfer transistor coupled between the second internal node and the intermediate node, the first and second transfer transistors being alternately operable, in respective half-periods of operation of the charge pump circuit, the first high voltage phase signal and the second high voltage phase signal having voltage dynamics higher than a maximum voltage sustainable by the first transfer transistor and the second transfer transistor, and a protection stage coupled between the first and second internal nodes and the first and second transfer transistors so as to protect the first transfer transistor and the second transfer transistor from overvoltages present on the first internal node and second internal node.

2. The circuit according to claim 1, wherein said protection stage comprises a first protection transistor coupled between the first internal node and the first transfer transistor, and a second protection transistor coupled between the second internal node and the second transfer transistor;

the first protection transistor and the second protection transistor having control terminals connected together.

3. The circuit according to claim 2, wherein said first protection transistor and said second protection transistor are coupled in cascade configuration to said first transfer transistor and second transfer transistor.

4. The circuit according to claim 1, further comprising, for each charge pump stage, a stabilization stage, configured to supply a respective control signal to the control terminals of the first transfer transistor and second transfer transistor; and wherein said protection stage comprises a first biasing unit, configured to supply to the control terminals of the first protection transistor and of the second protection transistor a first biasing signal, a value of which is a function of the values of the control signals present on the control terminals of the first transfer transistor and second transfer transistor.

5. The circuit according to claim 4, wherein said first transfer transistor and second transfer transistor comprise p-channel MOS transistors; and wherein said first biasing signal has a substantially constant value throughout the operating period, equal to the lowest of the values assumed by the control signals present on the control terminals of the first transfer transistor and second transfer transistor.

6. The circuit according to claim 5, wherein said stabilization stage comprises:

a first biasing capacitor coupled to the control terminal of the second transfer transistor and configured to receive a first low voltage phase signal, and a second biasing capacitor coupled to the control terminal of the first transfer transistor and configured to receive a second low voltage phase signal, complementary with respect to the first low voltage phase signal, the low voltage phase signals having values corresponding to the high voltage phase signals, in the voltage dynamics sustainable by the first transfer transistor and second transfer transistor; and a first control transistor coupled between the control terminal of the second transfer transistor and the intermediate node and having a respective control terminal coupled to the control terminal of the first transfer transistor, and a second control transistor coupled between the control terminal of the first transfer transistor and the intermediate node and having a respective control terminal coupled to the control terminal of the second transfer transistor;

wherein a voltage value on the intermediate node is substantially constant throughout the operating period of the charge pump circuit.

7. The circuit according to claim 6, wherein the first biasing unit of the protection stage comprises:

a first buffer capacitor coupled to a first internal node of the first biasing unit and configured to receive the first low voltage phase signal, and a second buffer capacitor coupled to a second internal node of the first biasing unit and configured to receive the second low voltage phase signal; and a first biasing transistor coupled between the control terminal of the first transfer transistor and an output of the first biasing unit, and having a respective control terminal coupled to the first internal node;

a second biasing transistor coupled between the first internal node and the output of the first biasing unit, and having a respective control terminal coupled to the second internal node;

a third biasing transistor coupled between the second internal node and the output of the first biasing unit, and having a respective control terminal coupled to the first internal node; and a fourth biasing transistor coupled between the control terminal of the second transfer transistor and the output of the first biasing unit, and having a respective control terminal coupled to the second internal node.

8. The circuit according to claim 1, wherein a maximum value of the dynamics of the high voltage phase signals is not higher than twice the maximum voltage sustainable by the first transfer transistor and second transfer transistor.

9. The circuit according to claim 1, wherein the subsequent charge pump stage comprises:

a respective first pump capacitor coupled to a respective first intermediate node and receiving the second high voltage phase signal, and a respective second pump capacitor coupled to a respective second internal node and receiving the first high voltage phase signal; and a third transfer transistor coupled between the respective first internal node and the intermediate node, and a fourth transfer transistor coupled between the respective second internal node and the intermediate node;

and wherein said protection stage comprises a third protection transistor coupled between the respective first internal node and the third transfer transistor, and a fourth protection transistor coupled between the respective second internal node and the fourth transfer transistor;

the third protection transistor and the fourth protection transistor having control terminals connected together.

10. The circuit according to claim 9, wherein said third transfer transistor and fourth transfer transistor comprise n-channel MOS transistors; and wherein said protection stage comprises a second biasing unit, configured to supply to the control terminals of the third protection transistor and fourth protection transistor a second biasing signal, which has a substantially constant value throughout the operating period, equal to the highest of the values assumed by the control signals present on the control terminals of the third transfer transistor and fourth transfer transistor.

11. A memory device comprising:

an array of memory cells and a charge pump circuit coupled thereto, said charge pump circuit comprising a plurality of charge pump stages cascaded to one another, each charge pump stage comprising a first pump capacitor coupled to a first internal node and configured to receive a first high voltage phase signal, and a second pump capacitor coupled to a second internal node and configured to receive a second high voltage phase signal, complementary with respect to the first high voltage phase signal, a first transfer transistor coupled between the first internal node and an intermediate node between said charge pump stage and a subsequent charge pump stage of said plurality of cascaded charge pump stages, and a second transfer transistor coupled between the second internal node and the intermediate node, the first and second transfer transistors being alternately operable, in respective half-periods of operation of said charge pump circuit, the first high voltage phase signal and the second high voltage phase signal have voltage dynamics higher than a maximum voltage sustainable by the first transfer transistor and the second transfer transistor, a protection stage coupled between the first and second internal nodes and the first and second transfer transistors so as to protect the first transfer transistor and the second transfer transistor from overvoltages present on the first internal node and second internal node.

12. The memory device according to claim 11, wherein said protection stage comprises a first protection transistor coupled between the first internal node and the first transfer transistor, and a second protection transistor coupled between the second internal node and the second transfer transistor; the first protection transistor and the second protection transistor having control terminals connected together.

13. The memory device according to claim 12, wherein said first protection transistor and said second protection transistor are coupled in cascode configuration to said first transfer transistor and second transfer transistor.

14. The memory device according to claim 11, further comprising, for each charge pump stage, a stabilization stage, configured to supply a respective control signal to the control terminals of the first transfer transistor and second transfer transistor; and wherein said protection stage comprises a first biasing unit, configured to supply to the control terminals of the first protection transistor and of the second protection transistor a first biasing signal, a value of which is a function of the values of the control signals present on the control terminals of the first transfer transistor and second transfer transistor.

15. The memory device according to claim 14, wherein said first transfer transistor and second transfer transistor comprise p-channel MOS transistors; and wherein said first biasing signal has a substantially constant value throughout the operating period, equal to the lowest of the values assumed by the control signals present on the control terminals of the first transfer transistor and second transfer transistor.

16. The memory device according to claim 15, wherein said stabilization stage comprises:

a first biasing capacitor coupled to the control terminal of the second transfer transistor and configured to receive a first low voltage phase signal, and a second biasing capacitor coupled to the control terminal of the first transfer transistor and configured to receive a second low voltage phase signal, complementary with respect to the first low voltage phase signal, the low voltage phase signals having values corresponding to the high voltage phase signals, in the voltage dynamics sustainable by the first transfer transistor and second transfer transistor; and a first control transistor coupled between the control terminal of the second transfer transistor and the intermediate node and having a respective control terminal coupled to the control terminal of the first transfer transistor, and a second control transistor coupled between the control terminal of the first transfer transistor and the intermediate node and having a respective control terminal coupled to the control terminal of the second transfer transistor;

wherein a voltage value on the intermediate node is substantially constant throughout the operating period of the charge pump circuit.

17. The memory device according to claim 16, wherein the first biasing unit of the protection stage comprises:

a first buffer capacitor coupled to a first internal node of the first biasing unit and configured to receive the first low voltage phase signal, and a second buffer capacitor coupled to a second internal node of the first biasing unit and configured to receive the second low voltage phase signal; and a first biasing transistor coupled between the control terminal of the first transfer transistor and an output of the first biasing unit, and having a respective control terminal coupled to the first internal node;

a second biasing transistor coupled between the first internal node and the output of the first biasing unit, and having a respective control terminal coupled to the second internal node;

a third biasing transistor coupled between the second internal node and the output of the first biasing unit, and having a respective control terminal coupled to the first internal node; and a fourth biasing transistor coupled between the control terminal of the second transfer transistor and the output of the first biasing unit, and having a respective control terminal coupled to the second internal node.

18. The memory device according to claim 11, wherein a maximum value of the dynamics of the high voltage phase signals is not higher than twice the maximum voltage sustainable by the first transfer transistor and second transfer transistor.

19. The memory device according to claim 11, wherein the subsequent charge pump stage comprises:

a respective first pump capacitor coupled to a respective first intermediate node and receiving the second high voltage phase signal, and a respective second pump capacitor coupled to a respective second internal node and receiving the first high voltage phase signal; and a third transfer transistor coupled between the respective first internal node and the intermediate node, and a fourth transfer transistor coupled between the respective second internal node and the intermediate node;

and wherein said protection stage comprises a third protection transistor coupled between the respective first internal node and the third transfer transistor, and a fourth protection transistor coupled between the respective second internal node and the fourth transfer transistor;

the third protection transistor and the fourth protection transistor having control terminals connected together.

20. The memory device according to claim 19, wherein said third transfer transistor and fourth transfer transistor comprise n-channel MOS transistors; and wherein said protection stage comprises a second biasing unit, configured to supply to the control terminals of the third protection transistor and fourth protection transistor a second biasing signal, which has a substantially constant value throughout the operating period, equal to the highest of the values assumed by the control signals present on the control terminals of the third transfer transistor and fourth transfer transistor.

21. A method of making a charge pump circuit comprising:
coupling together in cascade, a plurality of charge pump stages cascaded to one another with each charge pump stage comprising
- a first pump capacitor coupled to a first internal node and configured to receive a first high voltage phase signal, and a second pump capacitor coupled to a second internal node and configured to receive a second high voltage phase signal, complementary with respect to the first high voltage phase signal,
- a first transfer transistor coupled between the first internal node and an intermediate node between said charge pump stage and a subsequent charge pump stage of said plurality of cascaded charge pump stages, and a second transfer transistor coupled between the second internal node and the intermediate node, the first and second transfer transistors being alternately operable, in respective half-periods of operation of said charge pump circuit,
- the first high voltage phase signal and the second high voltage phase signal have voltage dynamics higher than a maximum voltage sustainable by the first transfer transistor and the second transfer transistor,
- a protection stage coupled between the first and second internal nodes and the first and second transfer transistors so as to protect the first transfer transistor and the second transfer transistor from overvoltages present on the first internal node and second internal node.

22. The method according to claim 21, wherein said protection stage comprises a first protection transistor coupled between the first internal node and the first transfer transistor, and a second protection transistor coupled between the second internal node and the second transfer transistor; the first protection transistor and the second protection transistor having control terminals connected together.

23. The method according to claim 22, wherein said first protection transistor and said second protection transistor are coupled in cascade configuration to said first transfer transistor and second transfer transistor.

24. The method according to claim 21, wherein said stabilization stage comprises:
- a first biasing capacitor coupled to the control terminal of the second transfer transistor and configured to receive a first low voltage phase signal, and a second biasing capacitor coupled to the control terminal of the first transfer transistor and configured to receive a second low voltage phase signal, complementary with respect to the first low voltage phase signal, the low voltage phase signals having values corresponding to the high voltage phase signals, in the voltage dynamics sustainable by the first transfer transistor and second transfer transistor; and
- a first control transistor coupled between the control terminal of the second transfer transistor and the intermediate node and having a respective control terminal coupled to the control terminal of the first transfer transistor, and a second control transistor coupled between the control terminal of the first transfer transistor and the intermediate node and having a respective control terminal coupled to the control terminal of the second transfer transistor;
- wherein a voltage value on the intermediate node is substantially constant throughout the operating period of the charge pump circuit.

* * * * *